(12) United States Patent
Barnes

(10) Patent No.: US 10,613,508 B2
(45) Date of Patent: Apr. 7, 2020

(54) METHOD OF GENERATING A MOVEMENT PROFILE FOR A LAYUP PROCEDURE

(71) Applicant: ROLLS-ROYCE PLC, London (GB)

(72) Inventor: Ashley Barnes, Derby (GB)

(73) Assignee: ROLLS-ROYCE PLC, London (GB)

( * ) Notice: Subject to any disclaimer, the term of this patent is extended or adjusted under 35 U.S.C. 154(b) by 59 days.

(21) Appl. No.: 15/768,334

(22) PCT Filed: Oct. 13, 2016

(86) PCT No.: PCT/GB2016/053172
§ 371 (c)(1),
(2) Date: Apr. 13, 2018

(87) PCT Pub. No.: WO2017/064491
PCT Pub. Date: Apr. 20, 2017

(65) Prior Publication Data
US 2018/0321656 A1    Nov. 8, 2018

(30) Foreign Application Priority Data

Oct. 15, 2015   (GB) .................................. 1518284.3

(51) Int. Cl.
*B29C 70/38* (2006.01)
*G05B 19/19* (2006.01)
(Continued)

(52) U.S. Cl.
CPC .............. *G05B 19/19* (2013.01); *B29C 70/38* (2013.01); *B29C 70/382* (2013.01);
(Continued)

(58) Field of Classification Search
CPC ..... B29C 70/38; B29C 70/382; B29C 70/386; G05B 19/19
See application file for complete search history.

(56) References Cited

U.S. PATENT DOCUMENTS 5,266,139 A * 11/1993 Yokota ................ B29C 53/8041
156/158
5,760,379 A * 6/1998 Matsen ............. B29C 66/73116
219/633
(Continued)

FOREIGN PATENT DOCUMENTS

EP   1341066 A2   9/2003
EP   1785795 A2   5/2007
(Continued)

OTHER PUBLICATIONS

Jan. 30, 2017—(WO) International Search Report and Written Opinion—App. No. PCT/GB2016/053172—10 pages.
(Continued)

*Primary Examiner* — Ronald D Hartman, Jr.
(74) *Attorney, Agent, or Firm* — Banner & Witcoff, Ltd.

(57) ABSTRACT

Computer-implemented methods of generating a movement profile for a layup procedure are provided. Methods include a movement profile defining relative movement between an applicator head and a tool along a head path for laying up a course of composite material. Method comprise: determining a bond strength profile along the head path; and determining a movement profile based on the bond strength profile, wherein the movement profile includes a variable rate of relative movement.

20 Claims, 11 Drawing Sheets

(51) Int. Cl.
*G05B 19/18* (2006.01)
*G05B 19/4097* (2006.01)

(52) U.S. Cl.
CPC .......... *B29C 70/386* (2013.01); *G05B 19/188* (2013.01); *G05B 19/4097* (2013.01)

(56) References Cited

U.S. PATENT DOCUMENTS

| | | | | |
|---|---|---|---|---|
| 5,902,935 | A * | 5/1999 | Georgeson | G01N 29/2412 73/801 |
| 5,939,007 | A * | 8/1999 | Iszczyszyn | B29C 70/32 264/258 |
| 8,071,171 | B1 * | 12/2011 | Doty | B29C 37/0085 427/272 |
| 8,088,317 | B1 * | 1/2012 | Karem | B29C 33/40 264/219 |
| 9,186,848 | B2 * | 11/2015 | Mark | B29C 70/20 |
| 2002/0144401 | A1 * | 10/2002 | Nogueroles Vines | B29C 70/342 29/897.2 |
| 2005/0061422 | A1 | 3/2005 | Martin | |
| 2006/0090856 | A1 | 5/2006 | Nelson et al. | |
| 2010/0170746 | A1 * | 7/2010 | Restuccia | B29C 70/083 181/290 |
| 2014/0113101 | A1 * | 4/2014 | Elbracht | B29C 70/24 428/86 |
| 2014/0297001 | A1 * | 10/2014 | Silverman | G05B 15/02 700/19 |
| 2015/0375461 | A1 * | 12/2015 | Blackburn | B29C 70/083 428/114 |
| 2017/0197371 | A1 * | 7/2017 | Fetfatsidis | B29C 70/382 |
| 2018/0154591 | A1 * | 6/2018 | Hauber | B29C 70/382 |

FOREIGN PATENT DOCUMENTS

| | | |
|---|---|---|
| EP | 1810816 A2 | 7/2007 |
| GB | 2101519 A | 1/1983 |

OTHER PUBLICATIONS

Mar. 14, 2016—(GB) Search Report—App. No. GB1518284.3—3 pages.

Oct. 23, 2019—(CN) Office Action—App No. 201680073539.7.

* cited by examiner

METHOD OF GENERATING A MOVEMENT PROFILE FOR A LAYUP PROCEDURE

CROSS REFERENCE TO RELATED APPLICATIONS

This application is a National Stage Application under 35 U.S.C. § 371 of co-pending PCT application number PCT/GB2016/053172, filed 13 Oct. 2016; which claim priority to GB1518284.3, filed 15 Oct. 2015, all of which are hereby incorporated by reference in their entireties for any and all non-limiting purposes.

The invention relates to a method of generating a movement profile between an applicator head and a tool for a layup procedure.

Composite materials are increasingly used for components that require particular combinations of material properties. In particular, composite materials such as Carbon Fibre Reinforced Polymer (CFRP) are commonly used for components in the aerospace and other industries due to their high stiffness and low weight. Composite materials typically comprise a reinforcement material (such as carbon fibre) and a matrix material (such as epoxy resin).

There are several known methods for automatically laying up composite material for a component, including Automatic Fibre Placement (AFP) and Automatic Tape Laying (ATL). In AFP, several individual fibres of composite material are gathered to form a tow, and the tow is laid over a tool and periodically cut to form a course of composite material. A narrow width of tape could be used instead of individual fibres or tows. In ATL, a wider tape is applied directly to the tool over a course.

In both AFP and ATL, composite material is typically applied to a tool using an automatic tool, known as an applicator head. The applicator head applies courses of tows or tape to the tool according to a pre-determined pattern to form each ply. The pre-determined pattern can be defined manually, semi-automatically or automatically. For example, a pattern of tow courses may be defined automatically by a steering program running on a computer which receives an input in the form of a plybook datafile, and generates a head path datafile for the applicator head. The plybook datafile typically comprises the definitions for a plurality of successive plies and their respective ply shapes for forming a composite component (or a pre-form for the component). The head path datafile typically comprises definitions for the steering path for the applicator head, together with cut locations for the various sections of the steering path (which correspond to the individual course), for laying up the plies defined in the plybook datafile.

Typically, the movement of the applicator head is speed-limited based on manually-applied speed limits, either for the head path as a whole, or individually for discrete portions of the head path as determined based on user experience. Speed limits are typically applied to prevent a course of composite material untacking during the layup procedure.

However, determining the speed limits in this way may be laborious and subject to error.

It is therefore desirable to provide an improved method of generating a movement profile for a layup procedure.

According to a first aspect of the invention there is provided a method of generating a movement profile for a layup procedure, the movement profile defining relative movement between an applicator head and a tool along a head path for laying up a course of composite material, the method comprising: determining a bond strength profile along the head path; and determining a movement profile based on the bond strength profile, wherein the movement profile includes a variable rate of relative movement.

The bond strength profile may be determined based on at least one local condition which varies along the head path. The bond strength profile may vary over the head path.

The bond strength profile may relate to the bond strength between a substrate (which may be the tool or underlying composite material) and a portion of the composite material. The portion of composite material may be the portion adjacent the applicator head at a respective position along the head path. In other words, the bond strength profile may relate to the bond strength of each respective portion of composite material along the head path when the respective portion is adjacent the applicator head (i.e. the bond strength of the portion as it has just been laid/applied). The bond strength may relate to a limit tension force that can be applied to the respective portion of composite material without the portion of composite material becoming un-tacked from the substrate. Accordingly, any additional tension force would result in un-tacking. The bond strength profile may consist of a single bond data point relating to a single location along the head path, and a bond strength parameter relating to the bond strength of the course at the respective location may be determined for the bond data point. The bond strength profile may comprise a plurality of data points at which a bond strength parameter relating to the bond strength of the course at a corresponding plurality of locations along the head path is determined.

The bond strength profile and/or the movement profile may correspond to a fraction of the head path or the full extent of the head path. The bond strength profile may relate to a portion of the head path corresponding to a single course of composite material. Alternatively, the head path may correspond to multiple courses. Successive and/or overlapping bond strength profiles and/or movement profiles may be determined.

The bond strength profile may include at least one bond data point corresponding to a respective position along the head path. Determining the bond strength profile may comprise, for each bond data point: determining one or more local conditions for the respective position along the head path; and determining a bond strength parameter for the bond data point based on the or each local condition for the respective position.

In particular, determining the bond strength profile may comprise, for each bond data point: determining at least one local condition for the respective position along the head path; determining the or each local condition for an antecedent position along the head path; and determining the bond strength parameter based on the or each local condition relating to the respective position and the or each antecedent position along the head path.

The or each local condition may be determined for a plurality of antecedent positions along the head path, and the bond strength parameter may be based on the or each local condition for the respective position and each of the plurality of antecedent positions along the head path.

The bond strength parameter for each bond data point may be determined at least partly based on the bond strength parameter for a bond data point relating to an antecedent position along the head path.

The movement profile may comprise at least one movement data point corresponding to a respective position along the head path. For each movement data point, a movement parameter relating to the relative movement between the applicator head and the tool may be determined based on at least one bond data point of the bond strength profile.

For each movement data point, a movement parameter may be determined based on a plurality of bond data points. The movement parameter may relate to a relative position, relative rate of movement, or relative acceleration of the applicator head and tool correlated to a position along the head path and/or a time point in the layup procedure.

The movement profile may comprise a plurality of movement data points corresponding to respective positions along the head path. The movement profile may consist of a single movement data point.

For each movement data point, the movement parameter may be determined based on at least one bond data point corresponding to an antecedent position along the head path (relative to the respective position along the head path for the movement data point). For each movement data point, the movement parameter may be determined based on at least one bond data point corresponding to a forward position along the head path relative to the respective position for the movement data point.

The bond strength profile may be determined based on at least one local condition selected from the group consisting of: a stuck distance parameter relating to the applied length of the course; a curvature parameter relating to a curvature of a respective portion of the head path and/or the course and/or the substrate.

The bond strength profile may be determined at least partly based on one or more conditions selected from the group consisting of: a tackiness parameter relating to the tackiness of the composite material; an age of the composite material; a temperature of the environment, composite material, pre-form or tool; an applicator head compaction force; a temperature parameter relating to the temperature of the pre-form, composite material, tool or environment, and a surface finish property relating to the smoothness of the substrate. The conditions may be evaluated based on stored values in a database, entered manually by an operator, or determined using sensors periodically and/or during a layup procedure.

The temperature parameter may be predicted, or may be determined using a sensor during a layup procedure.

The method may further comprise determining a predicted tension profile along the head path relating to the tension force applied to the composite material during a layup procedure owing to relative movement in accordance with the movement profile.

The method may further comprising outputting movement profile data corresponding to the movement profile to a resource, such as a computer-readable disk.

The movement profile data may include the predicted tension profile. Accordingly, in a subsequent layup procedure, the movement profile may be scaled based on a comparison between the predicted tension profile and a monitored tension applied to the composite material owing to relative movement in accordance with the movement profile.

The movement profile data may be defined so that in use in a layup procedure there is relative movement between the applicator head and the tool that substantially corresponds to the movement profile. For example, the movement profile data may comprise a sampling of a movement profile, or instructions for a variable position, movement rate, acceleration, and/or or power input to an applicator head and/or tool as a function of time or position. The movement profile data may comprise speed limits or acceleration limits defined for discrete portions of a head path based on the movement profile. A movement profile comprising such limits may be used for layup equipment that automatically determines its profile of relative movement but to which limits can be applied for safe or reliable operation.

The method may be computer-implemented.

According to a second aspect of the invention there is provided a method of laying up a course of composite material for a composite component, the method comprising: generating a movement profile defining relative movement between an applicator head and a tool along a head path for a layup procedure in accordance with the first aspect of the invention; and controlling layup equipment to cause relative movement between the applicator head and the tool according to the movement profile to layup the course of composite material.

According to a third aspect of the invention, there is provided a method of laying up composite material for a composite component, the method comprising: receiving a first movement profile defining relative movement between an applicator head and a tool along a head path for a layup procedure, or generating a first movement profile in accordance with the first aspect of the invention; controlling layup equipment to cause relative movement according to the first movement profile in a first layup procedure; determining a feedback parameter during the first layup procedure relating to at least one condition; generating a second movement profile in accordance with the first aspect of the invention so that the second movement profile is at least partly based on the feedback parameter.

Receiving a first movement profile may comprise determining the movement profile from movement profile data. The method may further comprise controlling layup equipment to cause relative movement according to the second movement profile. The method may be conducted to generate successive movement profiles relating to successive portions of the head path.

The first layup procedure may correspond to a first portion of the component and the second layup procedure may correspond to a second portion of the component. Accordingly, a single produced component (i.e. a single instance of a component) may be manufactured using both the first and second layup procedures.

The first layup procedure may correspond to a first component and the second layup procedure may correspond to a second component. The first and second components may be first and second instances of the same component design (i.e. first and second copies of the same component, or first and second components manufactured to the same design). Accordingly, the movement profile may be optimised over two or more layup procedures corresponding to two or more instances of the same component, such that the time to produce a particular component may be reduced as more components are made.

A plurality of feedback parameters may be determined and the second movement profile may be based on one or more of the feedback parameters.

The feedback parameter may be selected from the group consisting of: a temperature parameter relating to a temperature of the environment, composite material, pre-form or tool; a tackiness parameter relating to the tackiness of the composite material; an age of the composite material; a tension parameter relating to a tension force applied to the composite material owing to the relative movement between the applicator head and the tool; a stuck distance parameter relating the applied length of the course; a curvature parameter relating to a curvature of a respective portion of the head path and/or the course and/or the substrate; a curvature parameter relating to a curvature of a respective portion of the head path and/or the course and/or the substrate; a compaction parameter relating the compaction force applied against the tool by the applicator head.

A profile of each feedback parameter may be stored, and each feedback parameter profile may be correlated with the movement profile. The second movement profile may be based on the or each feedback parameter profile.

The bond strength profile for generating the second movement profile may be determined at least partly based on the or each feedback parameter. The second movement profile may be determined based on the bond strength profile and the or each feedback parameter.

The feedback parameter may comprise a tension parameter relating to a tension force applied to the composite material owing to the relative movement along the head path. The tension parameter may be determined using a sensor coupled to the applicator head and responsive to a tension force applied to a portion of composite material extending between a feed apparatus of the applicator head and an applicator roller of the applicator head. Additionally or alternatively, the tension parameter may be determined using a sensor coupled to the tool and responsive to a reaction force imparted on the tool owing to the tension in the composite material.

The method may further comprise determining whether a profile of the tension parameter is indicative of the onset of un-tacking of the composite material, wherein the bond strength profile and/or the movement profile for the second layup procedure is determined based on the tension parameter when it is determined that the profile is indicative of the onset of un-tacking.

A profile of the tension parameter along the head path may be determined to be indicative of the onset of un-tacking when the rate of change of the tension parameter falls outside a predetermined range; when a profile of the tension parameter is unstable (i.e. a tension profile); and/or wherein the tension or tension profile departs from a predicted tension profile or a predicted tension parameter by a threshold amount. For example, the feed apparatus may comprise a tension control system having an actuator configured to adjust the tension applied to the composite material as it is applied (e.g. to maintain constant tension). The tension control system may include a sensor relating to the operation of the actuator, and the tension parameter may correspond to the output of the sensor. The actuator may stay substantially stationary when laying composite material on a uniform substrate (e.g. a flat plate). However, when there is slip between the composite material and the substrate, the actuator may be controlled to move to maintain constant tension (e.g. by lengthening the distance between the feed apparatus and the substrate). Accordingly, the onset of un-tacking may be determined when the profile of the tension parameter (the output of the sensor) exceeds a predetermined rate of change.

The predicted tension profile or predicted tension parameter may be predetermined. The predicted tension profile or predicted tension parameter may be based on the movement profile for the first layup procedure. For example, the predicted tension profile or predicted tension parameter may be based on the rate of relative movement along the head path and/or the acceleration of relative movement along the head path.

According to a fourth aspect of the invention there is provided a non-transitory computer-readable storage medium comprising computer-readable instructions that, when read by a computer, causes the performance of a method in accordance with the first, second or third aspects of the invention.

According to a fifth aspect of the invention, there is provided a signal comprising computer readable instructions that, when read by a computer, cause performance of a method in accordance with the first, second or third aspects of the invention.

According to a sixth aspect of the invention, there is provided a computer program that, when read by a computer, causes performance of a method in accordance with the first, second or third aspects of the invention.

According to a seventh aspect of the invention there is provided an apparatus comprising: at least one processor; and at least one memory comprising computer readable instructions; the at least one processor being configured to read the computer readable instructions and cause performance of a method in accordance with the first or second aspects of the invention.

The apparatus may further comprise: layup equipment including an applicator head and a tool; and a controller configured to control the layup equipment to cause relative movement between the applicator head and the tool.

The invention will now be described, by way of example, with reference to the following drawings, in which.

In order to put the invention into context, example design and manufacturing methods for a composite component as previously considered by the applicant (but not disclosed) will first be described with reference to FIGS. 1 and 2, as follows.

Figure 1:
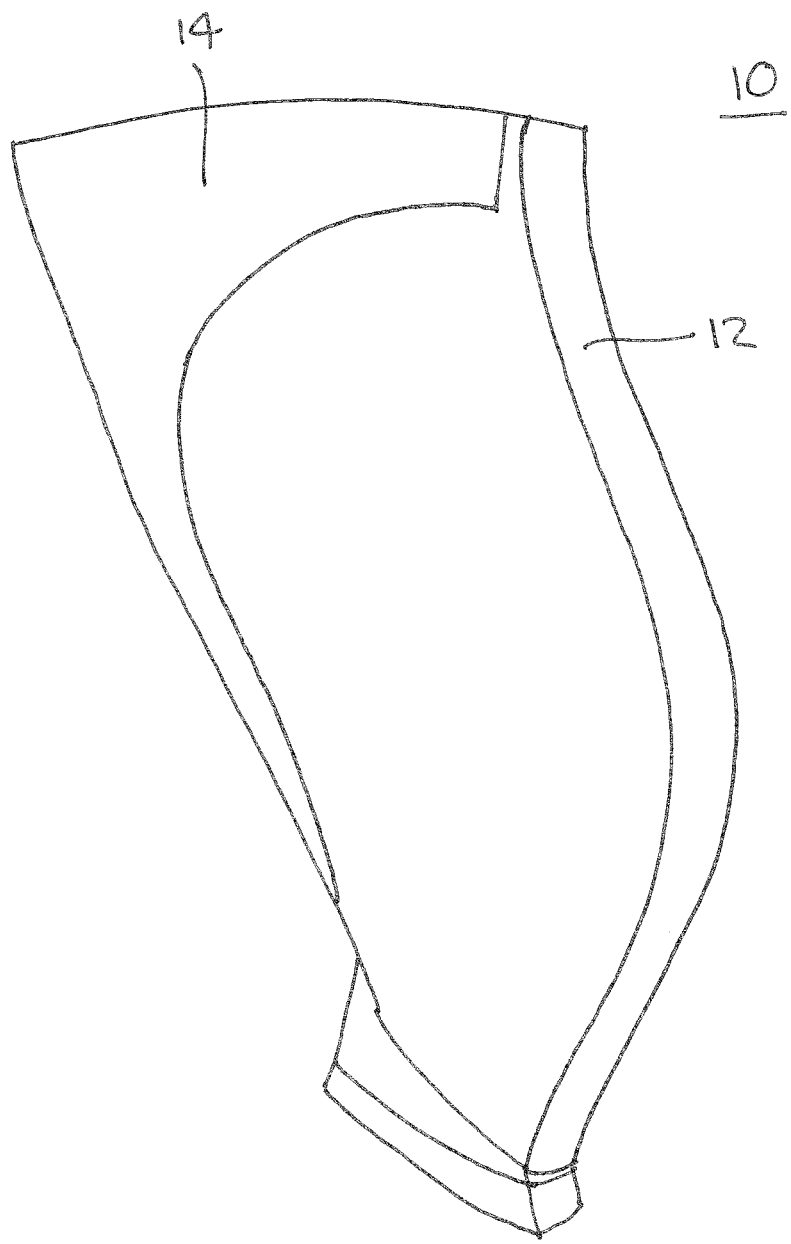
FIG. 1 shows a perspective view of a component volume corresponding to a composite component.

FIG. 1 shows a three-dimensional representation of a composite fan blade body 10, referred to herein as a component volume, as simulated in a computer. The fan blade body 10 includes recessed portions 12, 14 for the attachment of leading edge, trailing edge and tip metalwork.

Figure 2:
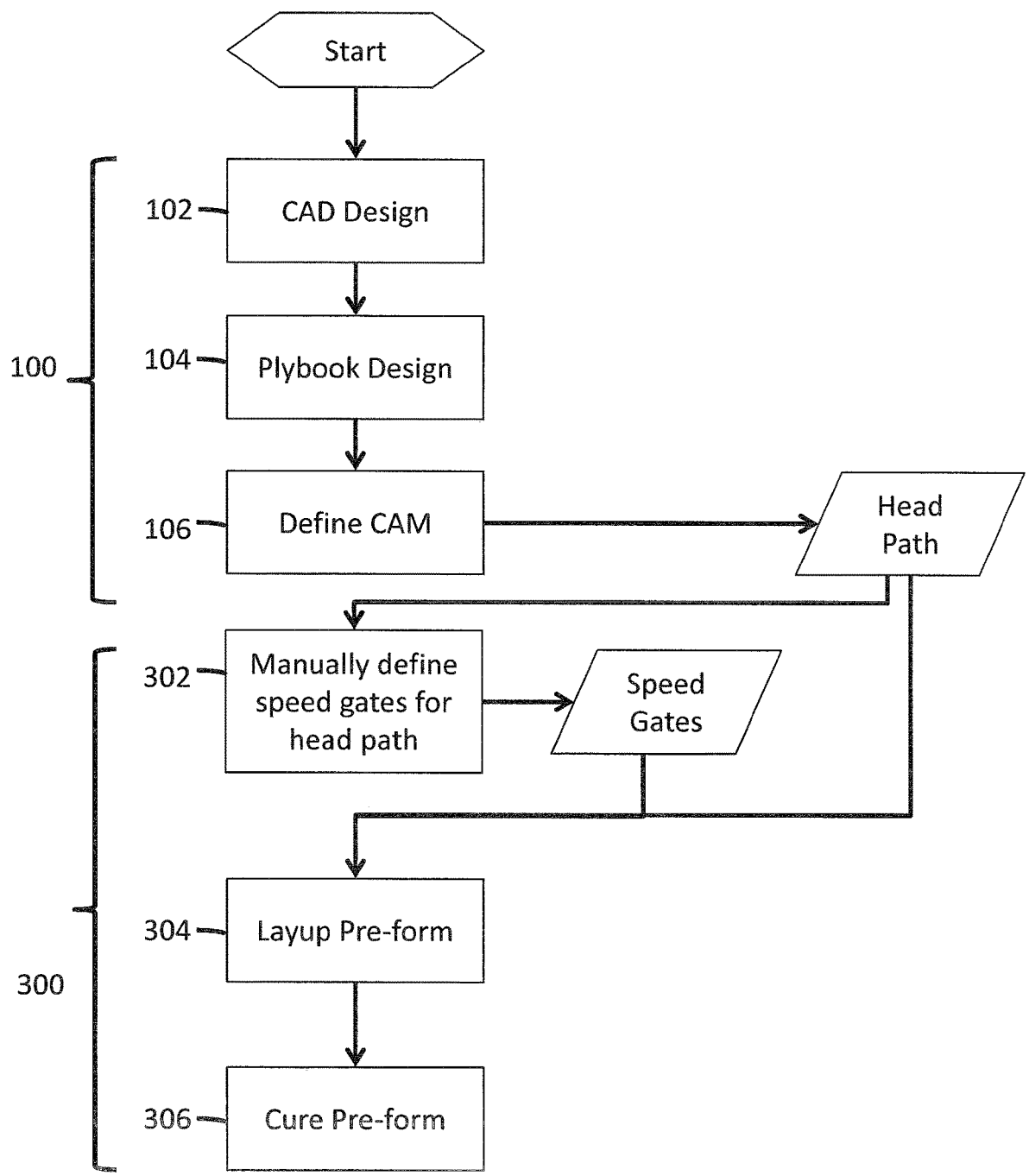
FIG. 2 shows methods for the design and manufacturing stage of a composite component.

FIG. 2 shows an example method of defining a layup procedure for the component (100) and an example method of manufacturing the component (300). The method of defining the layup procedure (100) comprises sub-methods including designing a CAD model of the component (102), defining plies of composite material for the component based on the CAD model (104) to generate a plybook, and defining a head path corresponding to relative movement between an applicator head and a tool in CAM (Computer Aided Manufacture) (104).

The subsequent method of manufacture (300) comprises manually defining speed limits (or "speed gates") for portions of the head path (302), operating layup equipment based on the head path and the speed gates (304) to manufacture a pre-form for the composite component, and curing the pre-form (306) to form the completed component.

The component volume can be generated according to any suitable CAD design method 102 as are known in the art. The plybook can be defined using any suitable automated, semi-automated or manual method of plybook design as is known in the art. The plybook comprises the definition of a plurality of successive plies (i.e. the ply shapes and relative positions of the plies).

The head path can be generated automatically, semi-automatically or manually as is known in the art. The applicant typically generates the head path using an automated approach by which the plies defined in the plybook are analysed, and a head path defined for laying up a plurality of courses of composite material to form each successive ply.

In this example, the head path corresponds to the entire pre-form to be laid up, and corresponds to a plurality of successive courses of composite material. Head path data comprising a series of positions of the applicator head relative a tool is output to a resource, such as a computer readable disk, and is read into layup apparatus comprising a controller, applicator head and a tool. The controller is configured to automatically determine a path to follow based on the positions. The head path data also includes a plurality of cut locations at which one course is to be terminated (i.e. by cutting the tows), and another begun.

Further, the controller is configured to accept user inputs that define speed limits for portions of the head path. In this example, the user manually selects portions of the head path by following a visual representation of the head path, and assigns speed limits (i.e. the speed of relative translation of the applicator head with respect to the tool) to particular sections (302). This is typically done based on the experience of the user, who may select a relatively low speed, such as 0.1 m/s, for complex-geometry portions of the head path, and relatively larger speeds, such as 0.8 m/s, for more simple or flat portions of the head path.

In the layup procedure (304), the controller causes the applicator head to move relative to the tool according to the head path data, so as to describe the head path, and limits the speed of the applicator head according to the prescribed speed limits, as correlated to portions of the head path. The controller also causes the composite tows to be cut at positions along the head path corresponding to the ends of the respective courses, as prescribed in the head path data.

Once the pre-form is laid up, the pre-form is then cured at elevated temperature and pressure to form the component (306), as is known in the art.

Figure 3:
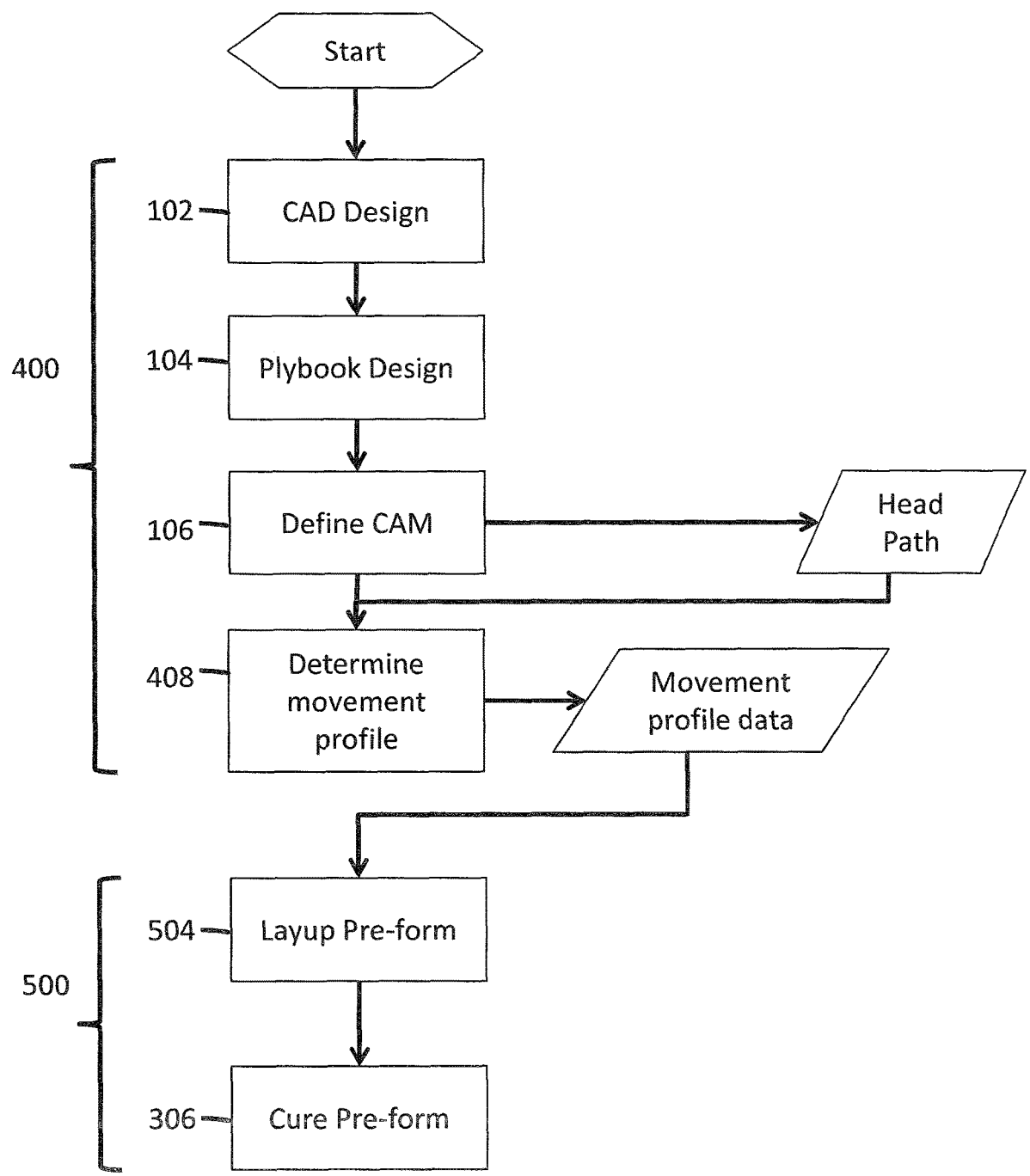
FIG. 3 shows methods for the design and manufacturing stages of a composite component, according to the invention.

As shown in FIG. 3, a method of defining a layup procedure and manufacturing a composite component according to the invention differs from the above in that a movement profile is determined (408) based on a bond strength profile along the head path, as will be described in detail below. Subsequently, in the manufacturing process (500), the pre-form is laid up based on the movement profile data (410), and the pre-form is subsequently cured (306), as described above.

Examples of methods for determining the movement profile will now be described in detail.

FIRST EXAMPLE

Figure 4:
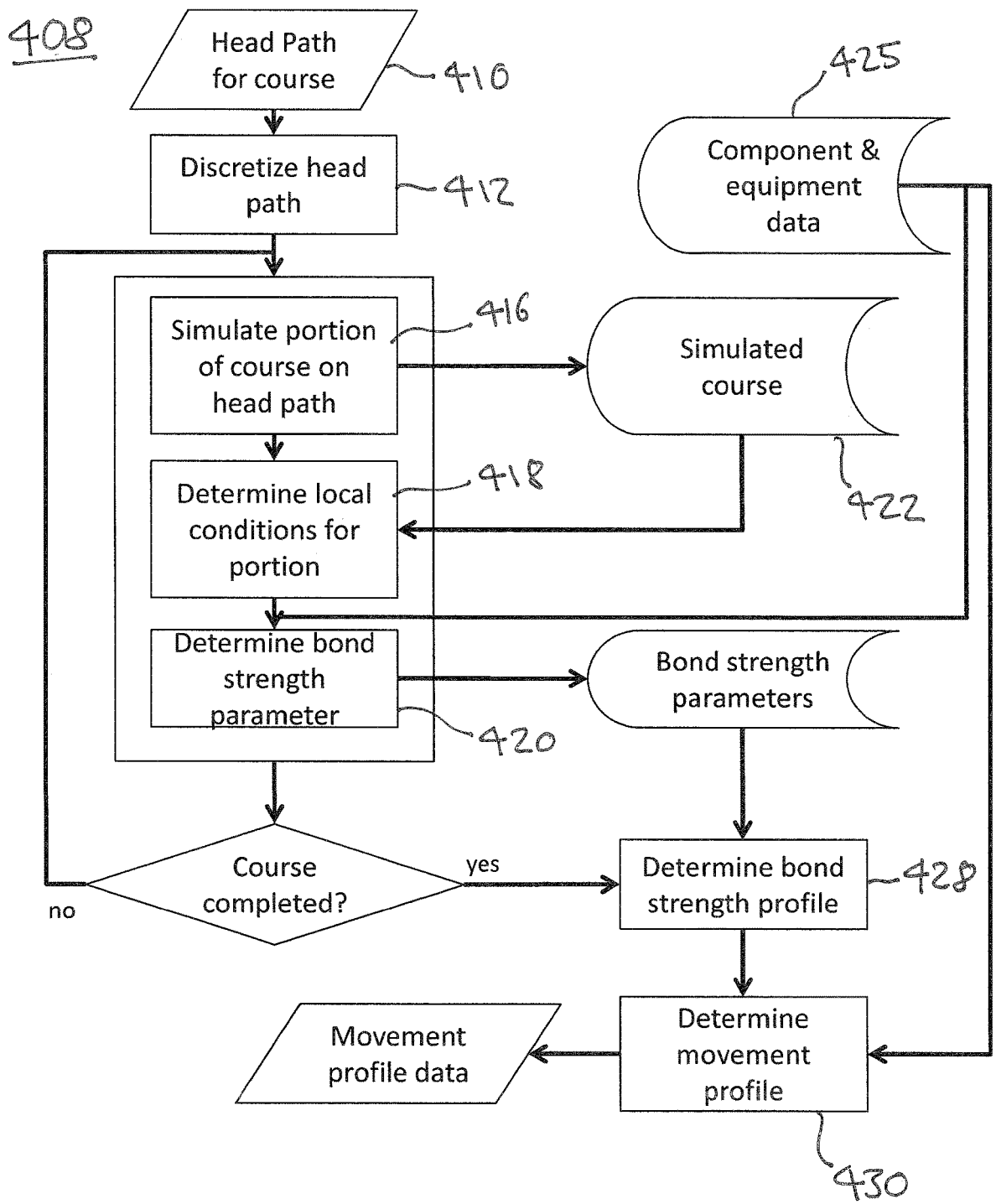
FIG. 4 shows a method of generating a movement profile.
Figure 5:
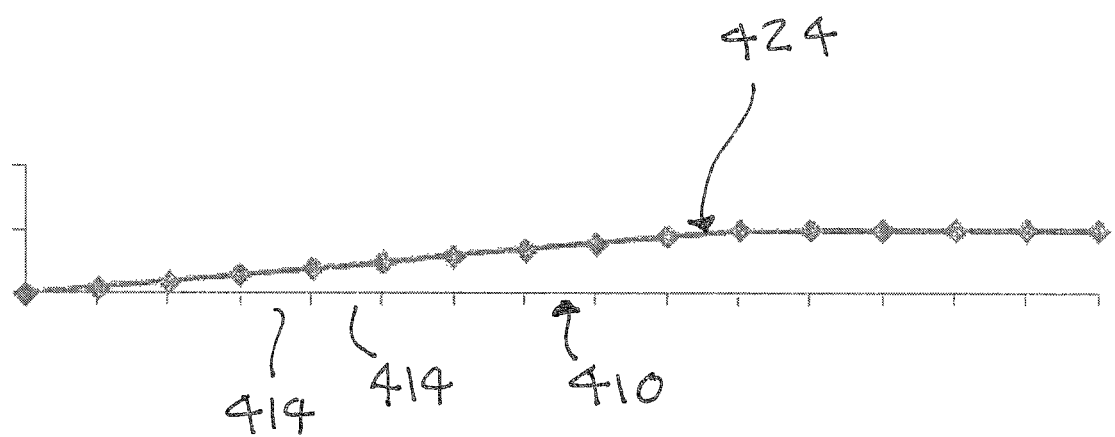
FIG. 5 illustrates a head path and corresponding limit tension profile.

A first example method of determining (or generating) the movement profile (408) will now be described with reference to FIGS. 4 and 5. FIG. 4 shows a flowchart for the method, whereas FIG. 5 shows an example simulated head path 410 for illustration purposes only, which in this first example is a linear course on a flat plate extending from left to right.

For simplicity, in this example the head path 410 corresponds to a single course of composite material. In other embodiments, the head path may correspond to several successive courses of composite material, and may correspond to all the courses required to layup the composite component.

The head path 410 corresponding to the course is received in a computer and is discretized (412) to provide successive portions 414 of the head path 410. In this example, the head path 410 is discretized into a predetermined number of portions of equal path length (e.g. 1000 portions), but in other embodiments different criteria may be used to determine the discrete portions, such as absolute path length (e.g. 5 mm) or at locations where there are changes in curvature or direction of the head path, or of material properties for use for the respective portions of the head path.

Each discretized portion 414 in turn is then processed to simulate the respective portion of the head path in the computer (416), determine local conditions for the portion (418), and determine a bond strength parameter for the portion (420), as will be described in detail below. Each portion is simulated and analyzed recursively as described above (i.e. in a loop) until the course is completed.

Each portion 414 of the course is simulated in the computer in any suitable manner so that it may be analysed. Accordingly, simulation does not require producing a graphically-representable model. In contrast, simulation may only require defining the information required to analyse the position and geometry of the portion 414. As each portion 414 is simulated, a model 422 of the simulated course is progressively built, comprising all of the successive portions, and stored in a memory of the computer.

In this first example embodiment, the local condition that is evaluated for each portion of the head path 410 is a stuck distance parameter. The stuck distance parameter relates to the path length of the course that has been laid, up to and including the respective portion of the course. The stuck distance for each respective portion is therefore determined by evaluating the path length of the portion, and by adding this path length to the cumulative path length of any previously simulated portions, as stored in the model 422. In other embodiments, two or more local conditions may be evaluated.

In this first example embodiment, the end of each discretized portion 414 of the head path 410 defines a bond data point at which a bond strength parameter is determined (420). The bond strength parameter is determined by estimating a tension limit corresponding to the maximum tension (or shear force) which can be applied to the course before it becomes un-tacked from a substrate (i.e. from the tool or underlying ply of composite material), and factoring the tension limit by a safety margin. Accordingly, the bond strength parameter at each location represents the bond strength of the course as laid up to the respective location (i.e. at a point of the respective layup procedure when the portion is adjacent the applicator head).

The tension limit is estimated at the bond data point based on an empirical relationship as a function of the stuck distance. The applicant has found that there is a relationship between the stuck distance of a course and the tension limit, owing to the increasing area of the course that is adhered to a substrate. For example, for a course applied to a flat plate, the tension limit may increase substantially linearly with stuck distance up to a threshold (or steady state) tension limit. This is graphically illustrated in FIG. 5, which overlays a tension limit profile 424 along the head path 410 (or course), wherein the normal separation of the tension limit profile 424 from the head path 410 is proportional to the tension limit for the respective bond data points.

In this embodiment, the tension limit is determined based on the local condition of stuck distance, in addition to other global conditions which influence the estimated tension limit, including:

the specific material for the layup procedure;
a tackiness parameter relating to the tackiness of the composite material;
an age of the composite material;
a temperature of pre-form during the lay-up procedure;
a temperature of the composite material as it is applied to the pre-form;
the width of the composite material;
a compaction force as applied during the layup procedure by an applicator roller; and
a surface finish property relating to the smoothness of the substrate.

In this embodiment, these global conditions are provided to the computer as estimates for the layup procedure stored in a component and equipment database 425, but in other embodiments the global conditions may be provided or updated based on feedback from a layup procedure, as will be described below with respect to third example embodiment.

The tackiness parameter may be provided in the form of an adhesion strength in units of N/m². The tackiness parameter may be derived from a lookup table based on the specific material for use in the layup procedure, and may be modified based on the age of the composite material.

The bond strength may increase with temperature, and also with increasing compaction force and tackiness. The tackiness of a material may decrease with age.

The bond strength parameter for each bond data point is determined by factoring the tension limit determined at the respective data point by a safety factor. In this embodiment, the safety factor is 20%, and so the bond strength parameter is 80% of the tension limit. The bond strength parameter for each bond data point is then stored in a memory.

Once each discretized portion of the course has been simulated, local conditions estimated and the bond strength parameter determined (416, 418, 420), the bond strength profile is determined based on the stored bond strength parameters (428). The bond strength profile comprises the series of bond strength parameters along the head path 410.

The movement profile is then determined along the head path 410 based on the bond strength profile (430). In this first example embodiment, the movement profile is determined to optimise the speed of the layup procedure whilst avoiding a tension force applied to the composite material exceeding the bond strength profile (which relates to the tension limit factored by a safety factor).

In this embodiment, the movement profile is determined iteratively by determining successive movement profiles, and evaluating corresponding predicted tension profiles with respect to the bond strength profile. An initial movement profile is determined based on the maximum speed and acceleration capability of the layup equipment (i.e. the relative speed and acceleration capabilities of an applicator head and tool). The movement profile is iteratively adjusted until the corresponding predicted tension profile does not exceed the bond strength profile.

The predicted tension profile is determined based on empirical relationships between a tension force in the composite material and the relative speed and/or acceleration of the applicator head and tool, as determined empirically by the applicant for various setups of layup equipment. For example, the tension profile may be based on a stored value of tension force per unit speed; a stored value of tension force per unit acceleration, and a stored value of a baseline tension force applied to composite material owing to a feed assembly of the applicator head which feeds composite material to the applicator head.

The movement profile can be iteratively optimised to minimise the overall time for laying up the head path whilst keeping the predicted tension profile within the bond strength profile, using optimisation methods as are known in the art. In this embodiment, the movement profile is defined by determining a time stamp for each of a plurality of movement data points along the head path (which correspond to the locations of the bond data points). The time stamp determines the time from initiation of the layup procedure that the applicator head lays up the respective portion, and therefore all derivative quantities such as speed and acceleration can be determined from the movement profile defined in this way.

In other embodiments, the movement profile may be determined at each movement data point in terms of a speed of relative movement based on an average of the bond strength parameter for a plurality of corresponding bond data points (for example, the bond data point at the same respective location as the movement data point, an antecedent bond data point and a forward bond data point), thereby smoothing the speed of relative movement.

Once the movement profile has been determined, movement profile data is generated and output to a resource (such as a computer readable disk). In this embodiment, the movement profile data comprises a series of relative position coordinates for the applicator head and the tool, correlated by time.

In the subsequent manufacturing method, the layup equipment can interpret the movement profile data and control the applicator head and/or tool to move along a path in accordance with the movement profile data, thereby substantially achieving movement in accordance with the movement profile.

In other embodiments, the movement profile data may comprise a head path and a variable speed or acceleration profile for movement along the head path. Further, the movement profile may comprise series of vectors which describe the head path and movement profile.

SECOND EXAMPLE

Figure 6:
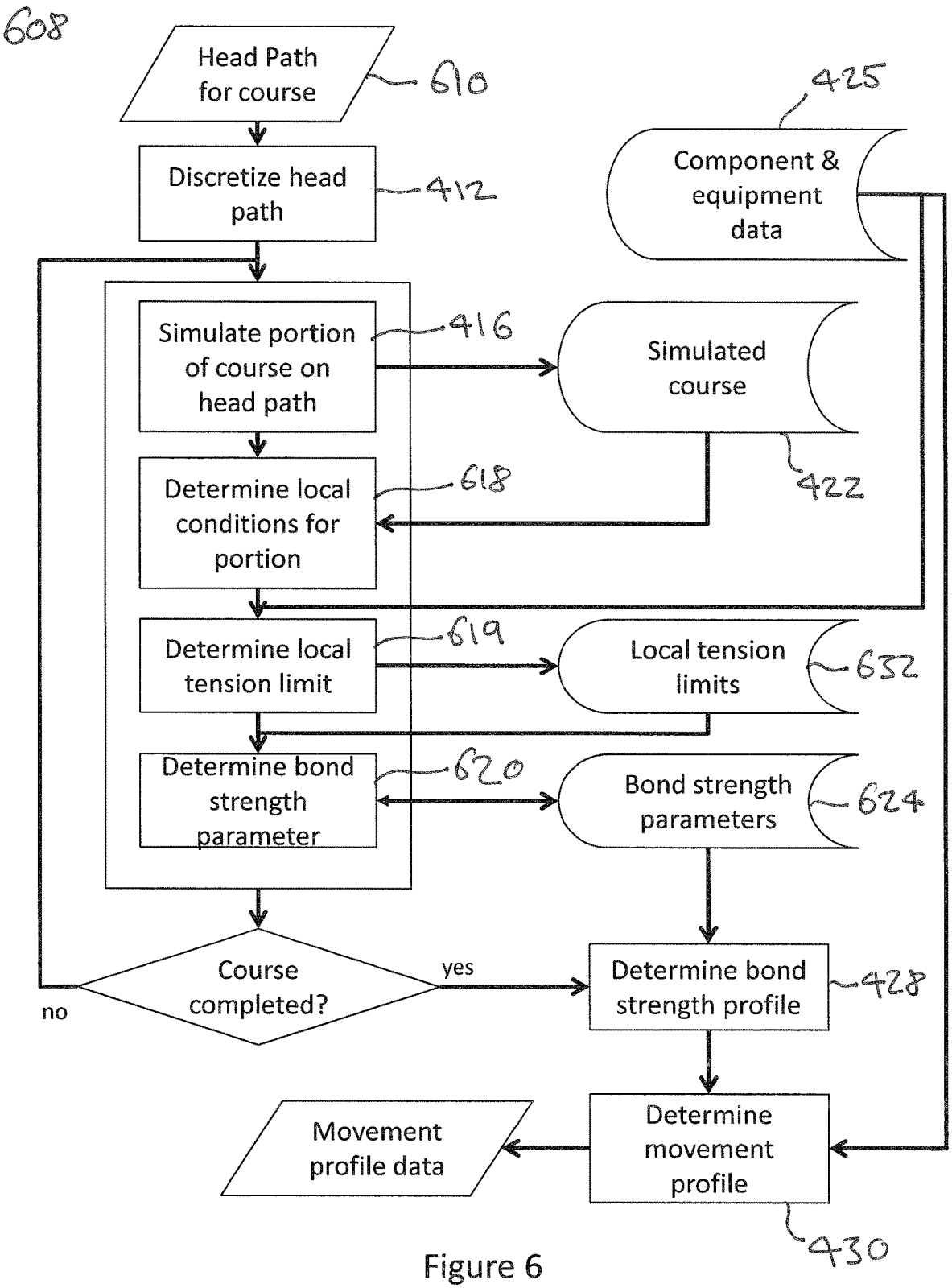
FIG. 6 shows a further method of generating a movement profile.
Figure 7:
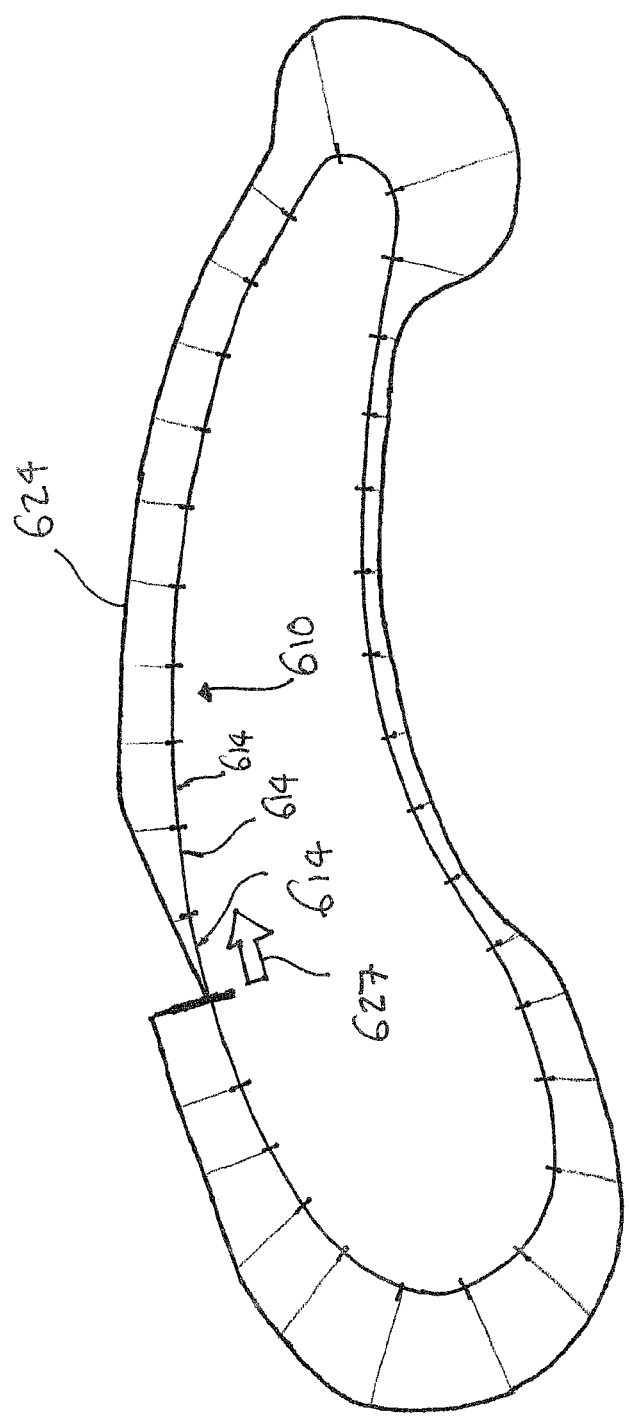
FIG. 7 illustrates a further head path and corresponding limit tension profile.

In a second example embodiment shown in FIGS. 6 and 7, a method of generating the movement profile (608) differs from the first example embodiment in that a cumulative tension limit for each portion of a head profile 610 is determined based on a local tension limit for the respective portion and on local tension limits for antecedent portions (if present). The bond strength parameter for each bond data point along the profile is based on the cumulative tension limit.

Further, this second example embodiments differs from the first example embodiment in that the local condition that is evaluated is a curvature parameter relating to the curvature of the head path.

As shown in FIG. 6, the head path 610 is received and discretized (412) in the same manner as described above with respect to the first example embodiment. Further, each course is simulated (416) in any suitable manner, as described above.

As shown in FIG. 7, in this example the head path 610 defines a single course which extends around an aerofoil section from a quarter-chord point on the suction side of the aerofoil in the direction of the trailing edge and subsequently returns along the pressure side and extends around the leading edge.

The curvature parameter may be defined in any suitable way. For example, the curvature parameter for a respective portion of the head path may be the maximum or principal curvature of the respective portion of the head path. The principle curvature of the respective portion is the maximum curvature resolved in any normal plane to the portion (i.e. a plane containing the normal of the respective portion of the head path). The curvature parameter may be determined based on the reciprocal of the radius of curvature in the respective normal plane (otherwise known as the radius of the osculating circle).

Alternatively, the curvature parameter may be the curvature in the normal plane which also contains the head path direction at the respective portion. The head path direction is the direction along which the head path extends at the respective portion. From hereon in, this curvature parameter will be referred to as the curvature along the head path.

In this example embodiment, the curvature parameter is the curvature along the head path, and the normal direction is defined as the direction extending from the tool to the applicator head (i.e. away from the layup surface of the tool). Accordingly, the curvature parameter is positive when the respective portion of the head path is generally concave, and negative when the curvature is generally convex. In other embodiments, the normal may be defined in a direction extending towards the tool. Accordingly, in the example aerofoil shown in FIG. 7, the suction side and the leading and trailing edges have negative curvature whereas the pressure side has positive curvature.

A local tension limit is determined for each portion of the head path 610 (619) based on the curvature parameter for the respective portion. In this embodiment, the local tension limit is determined without reference to antecedent portions of the head path 610, but based on the respective portion of the head path in isolation.

As described above with respect to the first embodiment, the tension limit is determined based on the local condition (in this embodiment, the curvature parameter) in addition to other global conditions, such as the temperature of the composite material as applied to the tool, and the specifications of the composite material. The tension limit for the respective portion is stored in a database of local tension limits 632.

Subsequently, the bond strength parameter is determined for the respective portion of the head path 610 (620). In this example embodiment, determining the bond strength parameter (620) comprises determining a cumulative tension limit based on the local tension limit of the respective portion and the local tension limit of one or more antecedent portions, and subsequently factoring the cumulative tension limit based on a safety factor, as described above with respect to the first example embodiment.

In particular, the applicant has found that the tension limit for a respective portion of the head path may depend both on the local conditions for the respective portion and the conditions of antecedent (previous) portions. However, the dependence on the local conditions or tension limit of antecedent portions may reduce as a function of the distance between the antecedent portion and the respective portion (i.e. the portion for which the tension limit is being determined).

Further, the applicant has found that the local tension limit for a respective portion depends on the curvature of the portion. In particular, the applicant has found that a portion of the head path having positive curvature may be more easy to untack than a flat plate (i.e. has a lower local tension limit). Further, the applicant has found that a portion of the head path having negative curvature may be more difficult to untack than a flat plate.

In view of the above, in this embodiment the impact of each portion on the tension limit estimation is weighted according to the position of each portion relative the respective portion. In particular, the cumulative tension limit evaluated at a particular portion of the head path n is determined based on a weighted sum of the local tension limit for the respective portion and one or more antecedent portions (if present).

In this example embodiment, the cumulative tension limit for a portion n is calculated as follows, where $\tau_n$ corresponds to the local tension limit for each respective portion n, and $\varepsilon_n$ corresponds to the cumulative tension limit evaluated for each respective portion n:

$$\varepsilon_n = 0.25\tau_{n-2} + 0.5\tau_{n-1} + \tau_n$$

Accordingly, the local tension limit $\tau_n$ for the portion n for which the cumulative tension limit is estimated has a greater impact on the cumulative tension limit than antecedent portions (i.e. portions n−1, n−2). Accordingly, the cumulative tension limit can fall from one portion to the next.

This trend is shown in FIG. 7, in which a cumulative tension limit profile (which is directly related to the bond strength profile using the safety margin) around the head path 610 is graphically represented by the profile 624. The normal separation between the profile 624 and the head path 610 is proportional to the cumulative tension limit. As shown at the beginning of the course (indicated by the arrow 627), which has only a moderate negative curvature, the cumulative tension limit increases with stuck distance up to a threshold where it reaches a steady rate value. Further, whilst there is a large increase in the cumulative tension profile 624 at the trailing edge of the aerofoil owing to the negative curvature at the trailing edge, there is also a significant decrease in the tension limit in the subsequent region of positive curvature on the pressure side of the aerofoil.

The cumulative tension limit for each bond data point is stored in a bond strength parameters database 624. Further, as described above, the bond strength parameter for each bond data point is determined (620) based on factoring the cumulative tension limit corresponding to each bond data point by a safety factor, which in this embodiment is 20% (so that the bond strength parameter is 80% of the cumulative tension limit). The bond strength parameters are also stored in the bond strength parameters database 624.

Subsequently, the bond strength profile and movement profile are determined based on the bond strength parameters, as described above with respect to the first example embodiment, so as to generate movement profile data for use in a layup procedure.

EXAMPLE 3

In a further example of the invention, a movement profile is generated based on conditions determined using feedback data from a layup procedure. Accordingly, a movement profile for a layup procedure can be defined, in whole or in part, based on conditions as monitored during the layup procedure.

Figure 8:
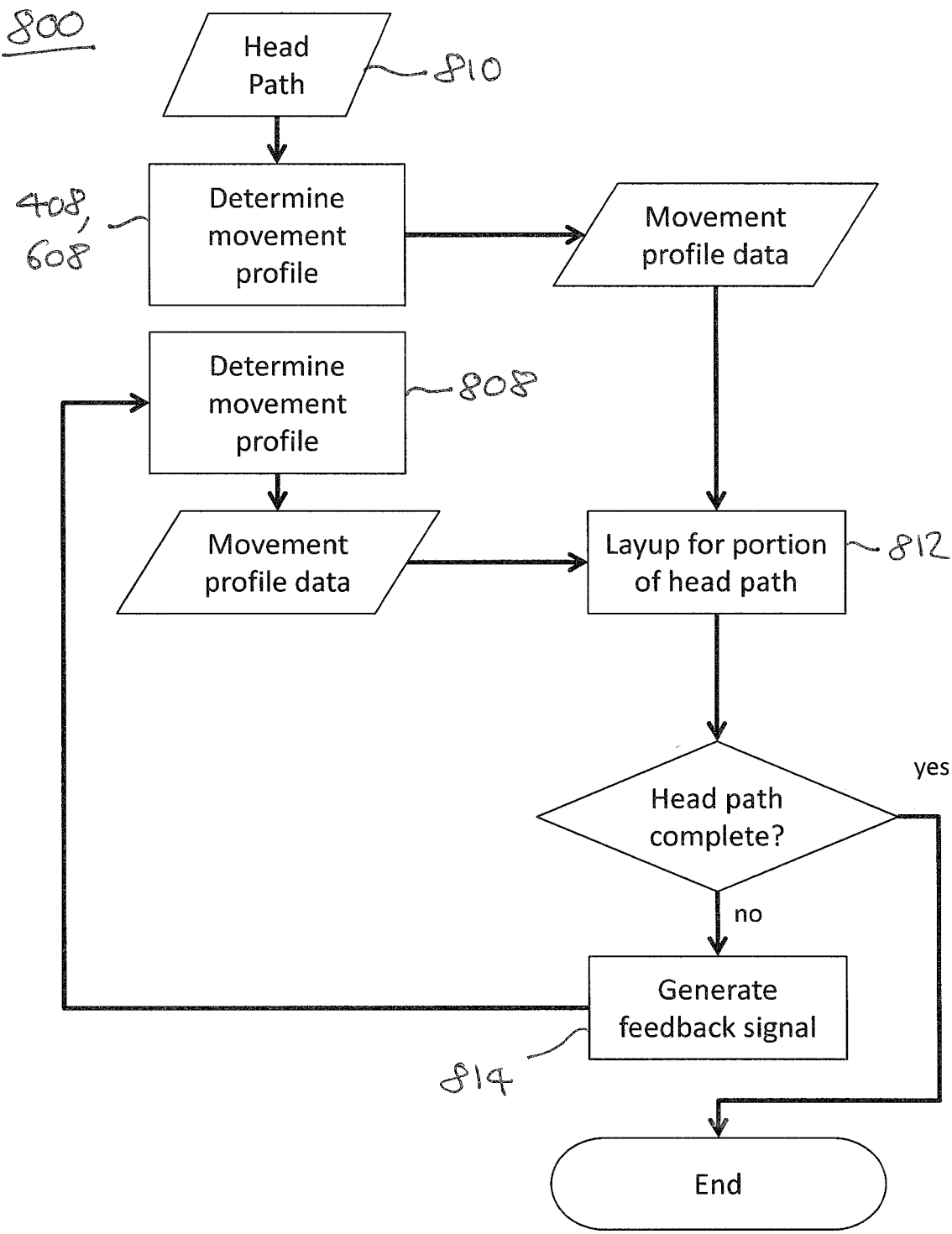
FIG. 8 shows a method of generating a movement profile and laying up a corresponding course of composite material.

FIG. 8 shows a method 800 of generating a movement profile whilst conducting a layup procedure, which in this embodiment replaces the separate methods of generating a movement profile (408, 608) and of laying up a pre-form (304, 504), as shown in FIGS. 3 and 5.

In the combined movement definition and layup method 800 of this third example, a first movement profile is determined (408, 608) as described above with reference to either the first or second examples to generate movement profile data for a head path 810.

A portion of the head path 810 is then laid-up to partially form a pre-form (812) for a component in a first layup procedure, and one or more feedback signals are generated by the layup equipment during the first layup procedure.

In this example embodiment, three conditions are monitored during the layup procedure. A first condition is a compaction force relating to the force applied by an applicator roller of the applicator head as the composite material is applied to the tool. A second condition is a temperature of the pre-form in the region of the applicator head. A third condition is a tension force applied to composite material as it is applied to the tool during the layup procedure.

The first condition is monitored using a force sensor coupled to the applicator roller to measure the pressure force applied by the applicator roller as it applies composite material to the tool along the head path.

The second condition is monitored using a pyrometer coupled to the applicator head and configured to monitor the temperature of the pre-form as the composite material is applied to the pre-form.

In this example embodiment, the tool remains stationary and the applicator head moves relative to the tool. The third condition is monitored using force sensors coupled to the tool and configured to resolve the tension force applied to the composite material based on the reaction of the tool to movement of the applicator head. In other embodiments, the third condition may be monitored using force sensors coupled to feed apparatus of the applicator head to determine the tension force applied to the composite material.

The three feedback signals are transmitted to a computer configured to generate a movement profile based on the head path and one or more of the monitored conditions (808).

Figure 9:
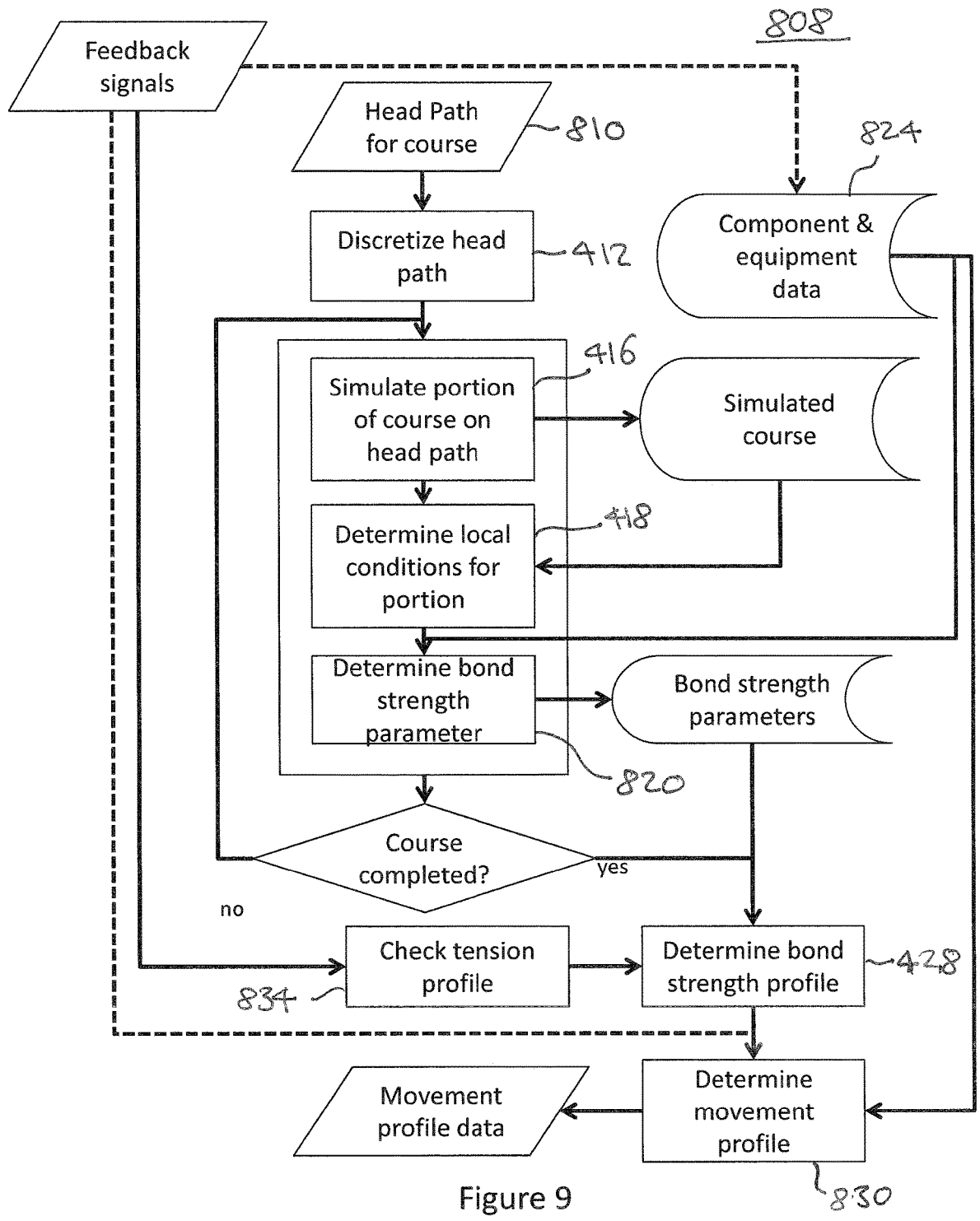
FIG. 9 shows the method of generating a movement profile of FIG. 8.

As shown in FIG. 9, the method of generating the movement profile (808) substantially corresponds to that described above with respect to the first example embodiment of the invention (408), but differs as follows.

Firstly, the feedback signal or signals (815) are received from the layup equipment. The feedback signals relating to the applicator roller force and the ply temperature (the first and second feedback signals) relate to global conditions, and the data for these conditions, as stored in the database 824, is updated on receipt of the feedback signal. Accordingly, in this third example method, the step of determining each successive bond strength parameter (820) is conducted based on these monitored conditions, as opposed to assumed values. This may improve the estimate of the bond strength parameter, and therefore optimise a second movement profile to be determined for the head path.

The third feedback signal relates to the tension force applied to the composite material. In this third example method (808), there is a further step (834) of checking the profile of the monitored tension force, and determining whether the profile indicates that the layup equipment is operating at or above the tension limit. In particular, the applicant has found that there is a relationship between the tension profile and untacking behaviour, such that the untacking behaviour can be determined based on the tension profile. For example, a rate of change in the tension profile along the head path outside of a predetermined range may be indicative of untacking behaviour. Accordingly, where the tension profile is indicative of untacking behaviour, the bond strength profile may be determined to be lower than the monitored or predicted tension in the composite material.

Further, the method of determining the movement profile (830) based on the bond strength profile differs, according to the third example embodiment, in that the prediction of tension force is at least partly based on the tension profile as determined from the third feedback signal (and provided to database 824). In particular, in this embodiment the movement profile is determined by iteratively determining a movement profile and predicting a corresponding tension profile along the head path so as to optimise the movement profile whilst maintaining the tension profile below the bond strength profile as described above. In this embodiment, each prediction of the tension profile is scaled based on the monitored tension profile, on the basis that the predicted tension profile can be corrected based on monitored values. Accordingly, the movement profile may be further optimised.

In this embodiment, the first movement profile corresponds to a first portion of a head path and the second movement profile corresponds to a second subsequent portion of the head path for the same component, and further movement profiles are generated for each successive portion of the head path that is laid up. Accordingly, the movement profile along the whole head path is defined based on the feedback parameters as the component is laid up by movement along the head path. The individual portions of the head path which are laid up may be defined by discretizing the head path into a predetermined number of portions, or portions of a predetermined path length. Alternatively, feedback parameters may be generated at regular intervals, and a new movement profiles may be generated when a feedback parameter changes significantly or moves outside of a predetermined range.

In other embodiments, the first movement profile may correspond to a complete head path, and the second movement profile may correspond to the same head path, but for making a second version of the component. Accordingly, a first movement profile may be defined relatively conservatively so that the layup procedure is somewhat slow. Subsequently, based on the feedback data, successive movement profiles may be generated which result in improved manufacturing times. In such embodiments, the relationship between relative movement and tension applied to the composite material (as used for determining the movement profile) may be refined based on a recorded tension profile for previously monitored movement profiles. The tension parameter can be monitored and the movement profile iteratively adjusted over successive layup procedures so that the recorded tension profile approaches a safety threshold set relative the tension profile. Accordingly, the layup procedure can be gradually refined over a number of versions of the same component.

In the foregoing description, steps of a method have been identified using reference numerals in parentheses, whereas simulated articles, such as the head profile 410, have been identified using reference numerals without parentheses.

Figure 10:
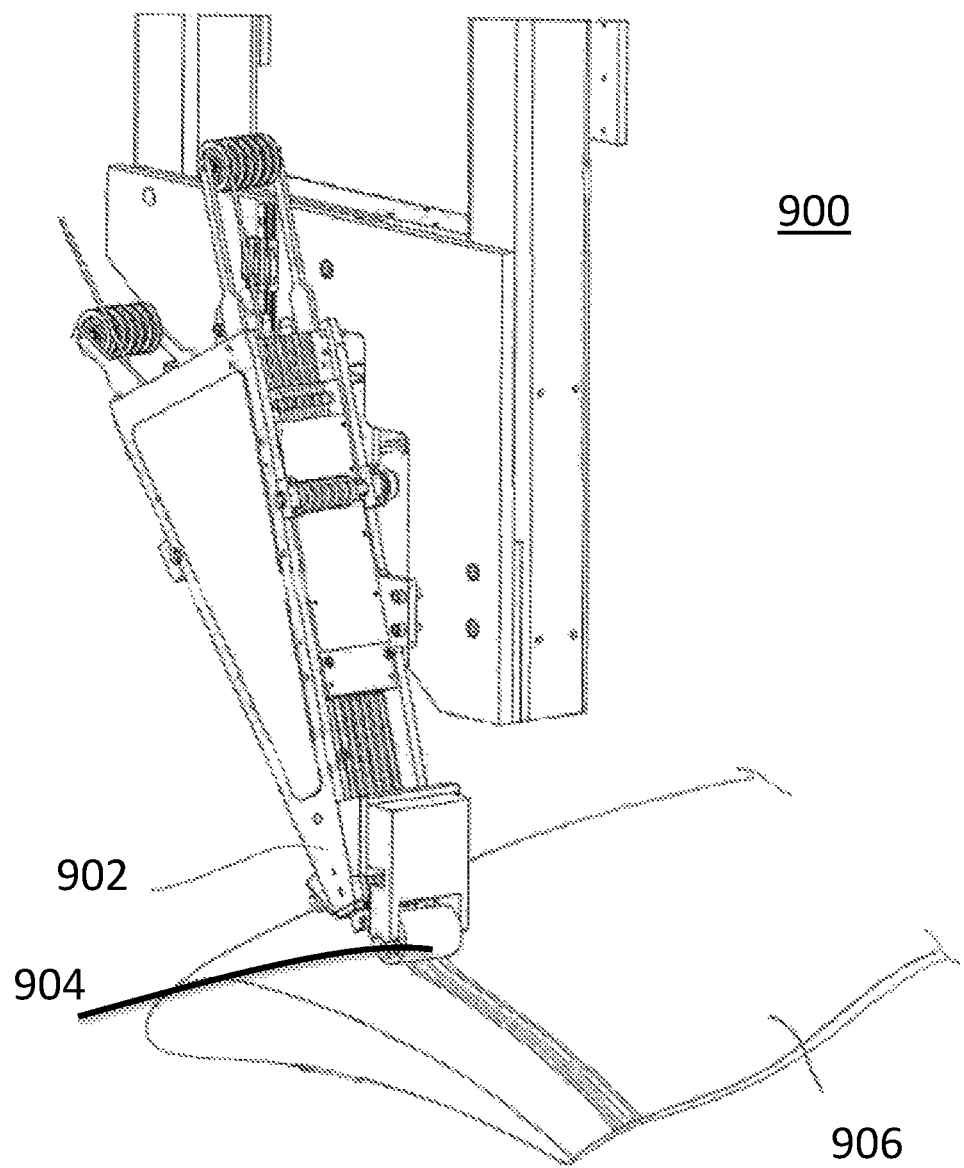
FIG. 10 shows layup apparatus.

FIG. 10 shows layup equipment 900 including an applicator head 902 configured to move relative a tool 906. The applicator head 902 includes an applicator roller 904 for applying courses of composite material to the tool 906.

Figure 11:
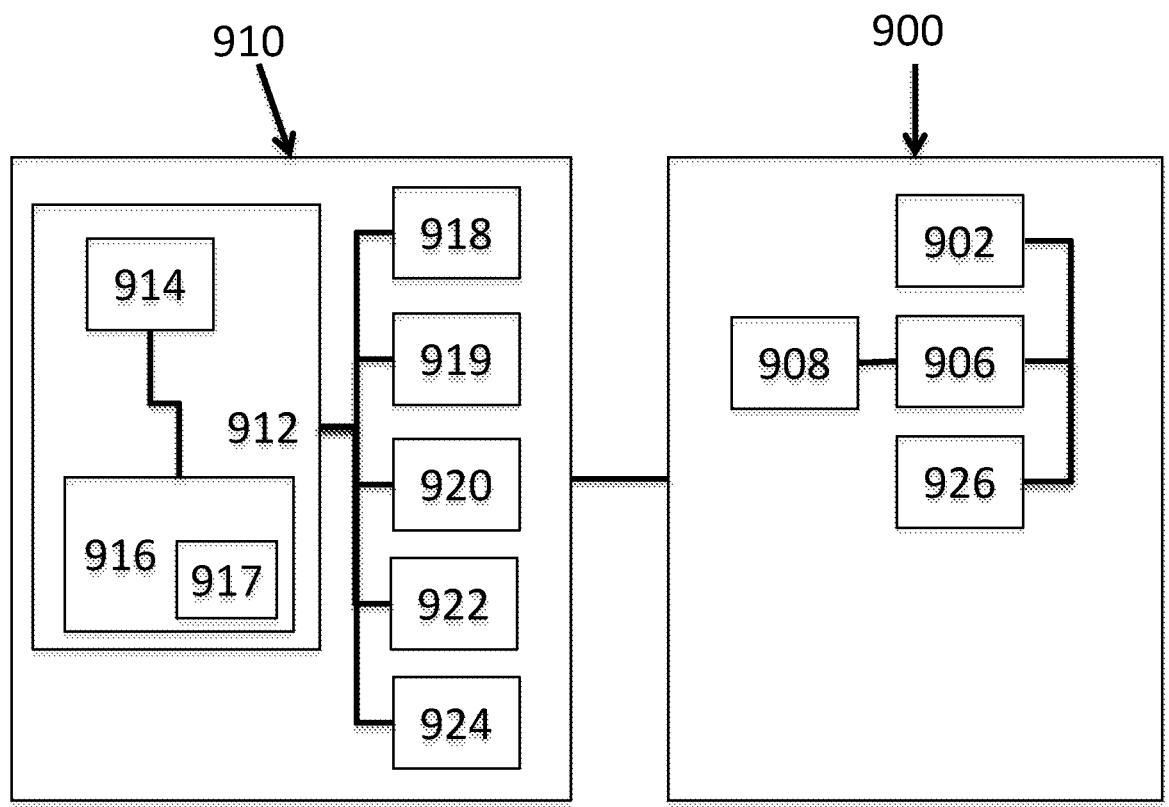
FIG. 11 shows processing apparatus and layup apparatus.

FIG. 11 shows a schematic diagram of control apparatus 910 and layup equipment 900 for carrying out the methods of generating a movement profile for a layup procedure and/or carrying out a layup procedure. The control apparatus 910 includes a controller 912, a user input device 918, and an output device 919. In some examples, the apparatus 910 may be a module. As used herein, the wording 'module' refers to a device or apparatus where one or more features are included at a later time, and possibly, by another manufacturer or by an end user. For example, where the apparatus is a module, the apparatus may only include the controller, and the remaining features may be added by another manufacturer, or by an end user.

The controller 912, the user input device 918, and the output device 919 may be coupled to one another via a wireless link and may consequently comprise transceiver circuitry and one or more antennas. Additionally or alternatively, the controller 912 and the various other components of the control apparatus 910 including the user input device and the output device may be coupled to one another via a wired link and may consequently comprise interface circuitry (such as a Universal Serial Bus (USB) socket). It should be appreciated that the controller, the user input device, and the output device may be coupled to one another via any combination of wired and wireless links.

The controller 912 may comprise any suitable circuitry to cause performance of the methods described herein with reference to FIGS. 3-9. The controller 912 may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

By way of an example, the controller may comprise at least one processor 914 and at least one memory 916. The memory 916 stores a computer program 917 comprising computer readable instructions that, when read by the processor, causes performance of the methods described herein with reference to FIGS. 3-9. The computer program 917 may be software or firmware, or may be a combination of software and firmware.

The processor 914 may include at least one microprocessor and may comprise a single core processor, may comprise multiple processor cores (such as a dual core processor or a quad core processor), or may comprise a plurality of processors (at least one of which may comprise multiple processor cores).

The memory 916 may be any suitable non-transitory computer readable storage medium, data storage device or devices, and may comprise a hard disk and/or solid state memory (such as flash memory). The memory may be permanent non-removable memory, or may be removable memory (such as a universal serial bus (USB) flash drive).

The memory 916 also stores the component and material databases and the bond strength parameters.

The computer program 917 may be stored on a non-transitory computer readable storage medium. The computer program 917 may be transferred from the non-transitory computer readable storage medium to the memory 916. The non-transitory computer readable storage medium 916 may be, for example, a USB flash drive, a compact disc (CD), a digital versatile disc (DVD) or a Blu-ray disc. In some examples, the computer program 917 may be transferred to the memory 916 via a wireless signal or via a wired signal.

The user input device 918 may comprise any suitable device for enabling an operator to at least partially control the apparatus. For example, the user input device 918 may comprise one or more of a keyboard, a keypad, a touchpad, a touchscreen display, and a computer mouse. The controller 912 is configured to receive signals from the user input device.

The output device 919 may be any suitable device for conveying information to a user. For example, the output device may be a display (such as a liquid crystal display, or a light emitting diode display, or an active matrix organic light emitting diode display, or a thin film transistor display, or a cathode ray tube display), and/or a loudspeaker, and/or a printer (such as an inkjet printer or a laser printer). The controller 912 is arranged to provide a signal to the output device 919 to cause the output device to convey information to the user.

The control apparatus further comprises an input interface 920 for receiving head path data, a feedback interface 922 for receiving feedback parameters from the layup equipment 900, and an output interface 924 for providing movement profile data to the layup equipment 900. The control apparatus 910 may be a computer.

The layup equipment 900 includes a further controller 926, an applicator head 902 and a tool 906, and sensor equipment 908 for determining the feedback parameters and sending these to the control apparatus 910. The controller 926 is configured to control the applicator head 902 and/or tool 906 for relative movement based on instructions received from the controller 912. In other embodiments, there may only be the controller 912 of the control apparatus (i.e. there may be no controller 926), which may directly control the layup equipment 900.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method of generating a movement profile for a layup procedure, the movement profile defining relative movement between an applicator head and a tool along a head path for laying up a course of composite material, the method comprising:
   determining a bond strength profile along the head path; and
   determining the movement profile based on the bond strength profile, wherein the movement profile includes a variable rate of the relative movement.

2. A method according to claim 1, wherein the bond strength profile is determined based on at least one local condition which varies along the head path.

3. A method according to claim 2, wherein the bond strength profile includes at least one bond data point corresponding to a respective position along the head path, and wherein determining the bond strength profile comprises, for each bond data point:
   determining one or more local conditions for the respective position along the head path; and
   determining a bond strength parameter for the bond data point based on the or each local condition for the respective position.

4. A method according to claim 3, wherein determining the bond strength profile comprises, for each bond data point:
   determining at least one local condition for the respective position along the head path;
   determining the or each local condition for an antecedent position along the head path;
   determining the bond strength parameter based on the or each local condition relating to the respective position and the or each antecedent position along the head path.

5. A method according to claim 3, wherein the bond strength parameter for each bond data point is determined at least partly based on the bond strength parameter for a bond data point relating to an antecedent position along the head path.

6. A method according to claim 3, wherein the movement profile comprises at least one movement data point corresponding to a respective position along the head path, and wherein for each movement data point a movement parameter relating to the relative movement between the applicator head and the tool is determined based on at least one bond data point of the bond strength profile.

7. A method according to claim 1, wherein the bond strength profile is determined based on at least one local condition selected from the group consisting of:
   a stuck distance parameter relating the applied length of the course;
   a curvature parameter relating to a curvature of a respective portion of the head path and/or the course and/or a substrate.

8. A method according to claim 1, further comprising determining a predicted tension profile along the head path relating to the tension force applied to the composite material during a layup procedure owing to relative movement in accordance with the movement profile.

9. A method according to claim 1, further comprising outputting movement profile data corresponding to the movement profile to a resource.

10. A method according to claim 1, further comprising:
   controlling layup equipment to cause relative movement between the applicator head and the tool according to the movement profile to layup the course of composite material for a composite component.

11. A method according to claim 1, wherein the generated movement profile is a second movement profile and the layup procedure is a second layup procedure, the method further comprising:
   receiving a first movement profile defining relative movement between the applicator head and the tool along a first head path for a first layup procedure;
   controlling layup equipment to cause relative movement between an the applicator head and the tool along the first head path according to the first movement profile in the first layup procedure;
   determining a feedback parameter during the first layup procedure relating to at least one condition;
   wherein the second movement profile is generated so that the second movement profile is at least partly based on the feedback parameter.

12. A method according to claim 11, wherein the first layup procedure corresponds to a first portion of a composite component and the second layup procedure corresponds to a second portion of the composite component; or
   wherein the first layup procedure corresponds to a first component and the second layup procedure corresponds to a second component.

13. A method according to claim 11, wherein the feedback parameter is selected from the group consisting of:
   a temperature parameter relating to a temperature of an environment, the composite material, a pre-form or the tool;
   a tackiness parameter relating to a tackiness of the composite material;
   an age of the composite material;
   a tension parameter relating to a tension force applied to the composite material owing to the relative movement between the applicator head and the tool;
   a stuck distance parameter relating the applied length of the course;
   a curvature parameter relating to a curvature of a respective portion of the head path and/or the course and/or a substrate;
   a compaction parameter relating a compaction force applied against the tool by the applicator head.

14. A method according to claim 11, wherein the bond strength profile for generating the second movement profile is determined at least partly based on the or each feedback parameter.

15. A method according to claim 11, wherein the second movement profile is determined based on the bond strength profile and the or each feedback parameter.

16. A method according to claim 11, wherein the feedback parameter comprises a tension parameter relating to a tension force applied to the composite material owing to the relative movement along the head path.

17. A method according to claim 16, further comprising determining whether a profile of the tension parameter is indicative of an onset of un-tacking of the composite material, wherein the bond strength profile and/or the second movement profile for the second layup procedure is determined based on the tension parameter when it is determined that the profile is indicative of the onset of un-tacking.

18. A non-transitory computer-readable storage medium, a signal or computer program comprising computer-readable instructions that, when read by a computer, causes performance of a method of generating a movement profile for a layup procedure, the movement profile defining relative movement between an applicator head and a tool along a head path for laying up a course of composite material, the method comprising:
   determining a bond strength profile along the head path; and
   determining the movement profile based on the bond strength profile, wherein the movement profile includes a variable rate of the relative movement.

19. An apparatus comprising:
   at least one processor;
   at least one memory comprising computer readable instructions;
   the at least one processor being configured to read the computer readable instructions, wherein the instructions are configured to cause the processor to perform a method of generating a movement profile for a layup procedure, the movement profile defining relative movement between an applicator head and a tool along a head path for laying up a course of composite material, the method comprising:
   determining a bond strength profile along the head path; and
   determining the movement profile based on the bond strength profile, wherein the movement profile includes a variable rate of the relative movement.

20. An apparatus according to claim 19, further comprising:
  layup equipment including the applicator head and the tool;
  a controller configured to control the layup equipment to cause relative movement between the applicator head and the tool.

* * * * *